Feb. 7, 1961 O. A. ROSS 2,970,796
QUICK RELEASE MECHANISM
Filed Oct. 27, 1958
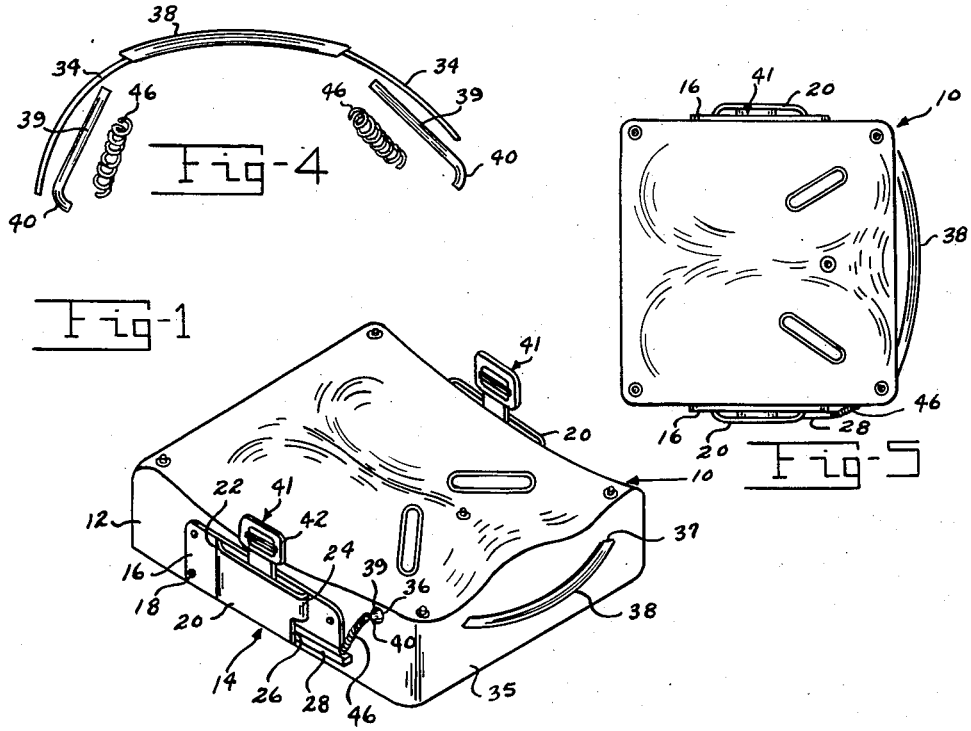
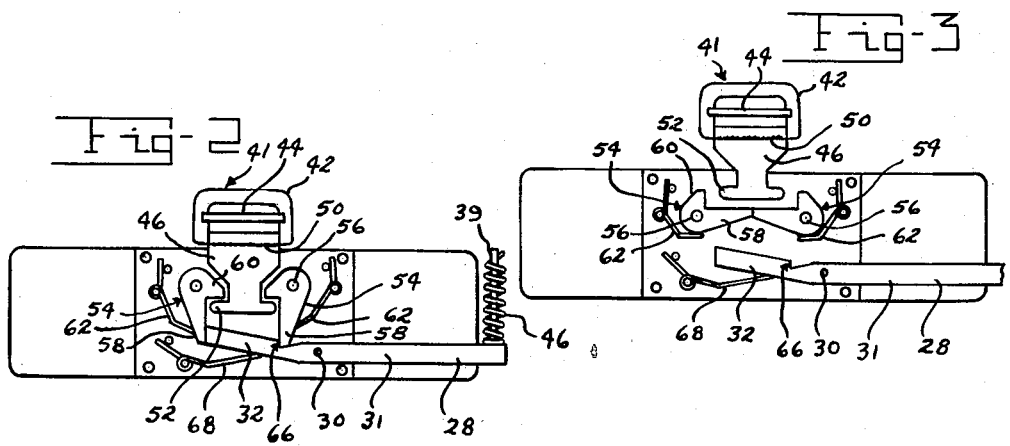
INVENTOR.
ORVAL A. ROSS
BY
ATTORNEYS

2,970,796
QUICK RELEASE MECHANISM

Orval A. Ross, 1568 Hillcrest Lane, Anchorage, Alaska

Filed Oct. 27, 1958, Ser. No. 769,954

6 Claims. (Cl. 244—151)

(Granted under Title 35, U.S. Code (1952), sec. 266)

The invention described herein may be manufactured and used by or for the United States Government for governmental purposes without payment to me of any royalty thereon.

This invention relates to a quick release mechanism and, more particularly, to a means for quick separation of the attachment of a survival kit from the D-rings of a flier's parachute harness.

In routine use of the survival kit, the receptacle is released to drop below the parachutist and be attached to his harness by a cord of considerable length (not shown) during his descent, so that it will not impede his fall but will be available to him when he lands.

The releases formerly available for this purpose have frequently failed, and for many reasons. One of these is the fact that the release handle or lever, or what not, which the flier must reach to operate the release, was frequently confused with the trigger for the ejection seat, so that the flier stood liable to operate one when he wished to operate the other. Furthermore, in crash landings or other ground emergencies the flier needs to be free to leave the plane quickly. This necessitates his being able to free himself instantly from any incumbrance.

Great reluctance sometimes amounting to severe mental blocks against fastening the seat or survival kit into the D-ring of his parachute harness was found in many crew members because of the fear that he would not be able to release it instantly when he wished. He was therefore deprived of the use of it later.

The object of the invention is the contrivance of a device which is reliable and sure and which will operate instantaneously to release the survival kit from the body of the flier, by a means readily available to the flier, and operable in such a way as to inspire his confidence and remove his reluctance and blocks against its use.

A further object of the invention is the provision of a device as described above which can be operated with one hand and from a position which cannot be confused with the trigger of an ejection seat, or any other emergency device.

A further object of the invention and one which is inherent in its structure is the removal of hazards as far as possible and the prevention of injuries in emergencies such as crash landings, emergency bail outs and other such situations.

A further object of the invention is the provision of a latch plate welded or otherwise secured to the parachute harness D-ring which is readily locked into a housing on a survival kit, and readily detachable therefrom.

In the accompanying drawings,

Fig. 1 is a perspective view showing the receptacle for a survival kit which functions at the same time as the seat for a flier.

Fig. 2 is a view of the release device attached to the D-ring adapter of a parachute harness wherein the front plate has been omitted to show the internal structure of the device.

Fig. 3 is a view similar to Fig. 2 showing the latching mechanism.

Fig. 4 is an exploded view of the cable, the cable housing, the biasing spring and the handle loop.

Fig. 5 is a top plan view of the kit receptacle.

Referring more in detail to the drawing, a receptacle or container 10 also serving as a seat for the flier has attached on each of its vertical side walls 12 a housing 14. The housing 14 and its contents is duplicated on the left and right side walls. One only will be described in detail.

The housing 14 consists of a rear plate 16 which is secured by any suitable means such as rivets 18 to the vertical side wall 12 of the receptacle 10, and a front plate 20 which is secured by suitable means to the back plate and is curved at its ends 22 and 24. The end 24 is provided with a cut away portion 26 which serves as an opening to accommodate a lever 28. The lever 28 is pivoted to the housing at 30 and comprises a pair of arms 31 and 32 on opposite sides of the pivot 30. A cable 34 is secured to the lever 28 at a point adjacent an end of the arm 31. The cable 34 enters the vertical wall 12 of the receptacle 10 through an opening 36, is carried through the receptacle and emerges on the front wall 35 sliding freely through an opening therethrough at 37. The cable then passes back through the front wall, through a corner of the receptacle, attaching to a trip device installed on the opposite side wall, and identical with the trip device shown and here described.

The loop 38 of the cable at the front of the receptacle forms an operating handle which is covered with a material suitable to expedite gripping and pulling. A pair of cable housings 39 protects the cable and expedites its sliding. A curved end 40 on each of the housings 39 protrudes through the openings 36, and further removes friction and promotes smooth sliding motion.

The parts of the device assume the position shown in Fig. 3 just before the adapter element now to be described is thrust into the housing for attachment, or just at the instant after it has been released. The elements of the adapter 41 are a conventional D-ring 42 and a sliding bar 44. The ends of the parachute harness straps (not shown) are drawn around the bar 44 in the conventional manner. A metal plate 46 is welded permanently or otherwise attached, as shown at 50 to the lower bar element of the D-ring. A pair of oppositely extending ears 52 on the plate 46 are adapted to operate a pair of latch members 54 when the adapter 41 is pressed downwardly. Each latch 54 is pivoted as shown at 56, to the rear wall of the housing, and comprises an arm 58 and a lug 60.

Each latch is biased to the substantially horizontal position shown in Fig. 3 by a spring 62. When the adapter 41 is inserted downward between the front and rear plates 16 and 20, the plate 46 encounters the arms 58 of the latches 54, pushing them downward against the bias of the springs 62. The device is then in attached condition, with the ears 52 held behind the lugs 60, and unseverable so long as the latches 54 remain in the position shown in Fig. 2. In this position, the arm 58 of one of the latches 54 engages the end of the arm 32 of the lever 28, and the other arm 58 engages a shoulder or detent 66 also located on the arm 32 of the lever 28. The lever is biased, and held in contact in this position by the spring 68, and additionally by the spring 46. The adapter 41 is thus securely locked to the kit.

When the flier or other operator wishes to release himself from the receptacle kit, he pulls on the handle 38. This he can do with one hand. The lever 28 is rocked about its pivot 30. The arm 31 is pulled upward against the bias of the spring 58, and the arm 32 is pulled downward against the bias of the spring 68. Instantaneously and by the same motion, the retaining lugs 60 are rocked out of holding position and the adapter is freed.

While the invention is shown and described in connection with one form for illustrative, rather than restrictive purposes, it is obvious that changes and modifications may be made by those skilled in the art without departing from the scope and spirit of the invention as defined in the accompanying claims.

I claim:

1. A quick release mechanism adapted to attach and quickly separate a survival kit from a parachute harness comprising a pair of identical housing devices adapted to be located on the opposite exterior side walls of the survival kit, each housing device comprising a rear wall and a front wall, said front wall having curved ends to provide spaced relationship between front and rear walls, a pair of latch members pivoted to one wall of said housing, an arm and a lug on each of said latches, a spring biasing each of said arms to a position toward each other and substantially horizontal, a plate adapted to be secured to each of a pair of parachute harness D-rings, extending ears on said plate, a lever having a pivot located in said housing, said lever having an arm on one side of said pivot extending outside of said housing and a latch detent located within said housing on the other, a cable, an end on said cable attached to the arm of said lever, the other end of said cable attached to the identical lever arm in the other of said housing devices, said ears on said plate capable of rocking said pivoted latches and engaging behind said lugs, said arms on said latches simultaneously engaging the detent and end of said lever respectively and placing said springs under tension to hold said ears locked behind said lugs in locked position within said housing, a handle on the mid portion of said cable positioned for grasping by an operator to release said lever from said arms to allow operation of said springs to move said arms to horizontal position releasing said plate and releasing said kit from said parachute harness.

2. A device adapted for attaching a survival kit to and quickly releasing it from a parachute harness comprising a plate permanently attached to each of a pair of parachute harness D-rings, a pair of rocking latches positioned in housings adapted to be located on each of the opposite sides of said kit, means on said plates for rocking said latches, means for locking said latches in rocked position and retaining said plate in engagement with said kit, a single cable extending across the front of said kit and attached to each of said locking means and operable by one hand of an operator for releasing said locking means, spring means for returning said latches to unrocked condition thus releasing said plate from said kit.

3. A device for attaching a survival kit to and quickly releasing it from a parachute harness comprising a plate adapted to be permanently attached to a pair of parachute harness D-rings, a pair of rocking latches adapted to be positioned on each of the opposite sides of said kit, means on said plates for rocking said latches, means for locking said latches in rocked position and retaining said plate in engagement with said kit, said means comprising a lever, a detent on said lever, arms on said rocking latches, one arm engaging said detent and the other arm engaging the end of said lever, means for releasing said locking means, said last named means comprising a cable secured to the end of said lever, a handle formed on said cable, whereby said lever may be moved to unlock said arms from locked position when said cable is pulled.

4. A release mechanism for attaching and quickly separating a seat receptacle to and from a parachute harness comprising a pair of plates for attachment to a portion of a parachute harness, means positioned on each of opposite vertical side walls of said receptacle for releasably attaching said plates to said receptacle, each of said means including a rocker latch and a lever, said latch and lever being operable to release said attachment by the pull of a cable, a cable attached to each of said levers and drawn through openings into the interior of said receptacle, and a single operating handle formed on a segment of said cable and extending across the front exterior wall of said receptacle, whereby said seat receptacle may be released from said parachute by one hand only of an operator.

5. A combination survival-kit-container-seat and a device for attaching and quick releasing said survival-kit-container-seat to and from a parachute harness, said device comprising two vertical and spaced side walls and a front wall on said container, an opening in each of said side walls located adjacent its upper edge and also adjacent its intersection with said front wall, a pair of openings in said front wall, a pair of rocking latches secured to each of said side walls and exteriorly thereof and provided each with an arm and a lug, a leaf spring for each of said rocking latches biasing the arms of each pair towards each other, a pair of plates each adapted to be secured to a parachute harness, a pair of ears on each plate, each of said plates adapted to rock said arms to substantially vertical position, said ears engaging behind said lugs to lock said plate to said seat, a lever for engaging said arms and holding said arms and lugs in locking position, a leaf spring for biasing said lever in locking position, a cable attached at its ends to the end of each lever, said cable passing through said first named openings into the interior of said container, and through said second named openings to form a handle operable by the occupant of said seat to release the engagement between said lever and said arms to release said plate and free the seat from the parachute harness.

6. A release mechanism for attaching and quickly separating a seat receptacle to and from a parachute harness comprising a pair of plates adapted for attachment to portions of a parachute harness, a hollow receptacle seat, vertical spaced side walls and a vertical front wall on said seat, said front wall being provided with a pair of spaced openings, each of said side walls being provided with an opening in its upper area and adjacent its intersection with said front wall, means positioned on each of said opposite vertical side walls for releasably attaching said plate to said receptacle, each of said means including a pair of rocker latches and a lever, lugs on said plates for engagement with said rocker latches to effect attachment of said receptacle to a parachute harness, said lever having a pivot in said housing and being capable of interengagement with said rocker arms to maintain said attachment, means for operating said levers to effect disengagement of said rockers and said levers, said means comprising a cable secured at its ends to said levers and drawn through the openings in said side walls into the interior of said receptacle and through the openings in said front wall to the exterior thereof, thereby forming an operating handle on a segment of said cable extending exteriorly across the front wall of said receptacle, tubular curved cable housing members enclosing said cable and located at the side wall openings to insure protection and free sliding of said cable, a spiral spring surrounding said cable and operating between said levers and said cable housings and biased to maintain contact between each of said levers and said rocker latches, a leaf spring in each of said housings operating on said levers on the opposite side of said pivots and reinforcing the bias of said spiral springs.

References Cited in the file of this patent

UNITED STATES PATENTS

| | | |
|---|---|---|
| 2,366,455 | Patten | Jan. 2, 1945 |
| 2,467,037 | Kajdan | Apr. 12, 1949 |
| 2,795,831 | Kesler | June 18, 1957 |
| 2,832,120 | Jayet | Apr. 29, 1958 |

FOREIGN PATENTS

| | | |
|---|---|---|
| 695,255 | Great Britain | Aug. 5, 1953 |
| 772,729 | Great Britain | Apr. 17, 1957 |